US005609777A

United States Patent [19]

Apunevich et al.

[11] Patent Number: 5,609,777

[45] Date of Patent: Mar. 11, 1997

[54] ELECTRIC-ARC PLASMA STEAM TORCH

[75] Inventors: Alexandr I. Apunevich, Moscow; Evgeny I. Titarenko, Zelenograd, both of Russian Federation

[73] Assignee: Adamas AT AG, Ceilenkirchen, Germany

[21] Appl. No.: 638,880

[22] Filed: Apr. 25, 1996

Related U.S. Application Data

[63] Continuation-in-part of Ser. No. 325,250, filed as PCT/RU93/00053 Feb. 23, 1993 published as WO94/19139 Sep. 1, 1994, abandoned.

[30] Foreign Application Priority Data

Feb. 23, 1993 [RU] Russian Federation PCT/RU93/00053

[51] Int. Cl.[6] .................................................... B23K 10/00

[52] U.S. Cl. ............................... 219/121.48; 219/121.52; 219/121.49; 219/121.57

[58] Field of Search ......................... 219/121.57, 121.48, 219/121.36, 121.49, 121.52, 75, 74, 121.59

[56] References Cited

U.S. PATENT DOCUMENTS 4,701,590 10/1987 Hatch ................................ 219/121.48

4,791,268 12/1988 Sanders et al. .................... 219/121.57

*Primary Examiner*—Mark H. Paschall

*Attorney, Agent, or Firm*—Collard & Roe, P.C.

[57] ABSTRACT

An electric-arc plasma torch has a body (1) having an axially arranged nozzle-anode (2) and a cathode (4), as well as a container (6) for working fluid, filled with a moisture-absorbing material (7). A nozzle (5) interconnecting the body and the container is filled with a porous heat-conducting material (8). The fluid absorbed by that material vaporizes, and the resultant steam passes through a ring (9) provided with passages, into a discharge chamber (11).

5 Claims, 2 Drawing Sheets

ELECTRIC-ARC PLASMA STEAM TORCH

This is a continuation-in-part of application Ser. No 08/325,250 filled on Oct. 20, 1994 now abandoned. International Application PCT/RU93/00053 filed on 23 February 1993, and which designated the U.S.

TECHNICAL FIELD

The present invention relates to electric-arc low-temperature plasma generators, i.e., plasma torches which can find application in mechanical engineering, automotive industry, aircraft, electrical-engineering, and some other industries for the various kinds of plasma treatment, such as cutting, welding, and heat treatment of surface of diverse materials.

More specifically this invention relates to those low-temperature plasma generators (plasma-arc torches) which make use of steam as a working medium.

BACKGROUND ART

Known in the art are plasma generators, wherein steam is used as a working medium, which can be supplied to the generator from a special source, or be produced immediately in the generator due to high temperatures. The steam generation process can be combined with heat abstraction from the electrodes.

A widespread solution of the problem aimed carrying out said process is supplying the vaporizable fluid through passages in the electrodes, said fluid vaporizing while flowing along said passages, simultaneously cooling the electrodes (PCT/F I 88/00427; SU, A, 1,620,032).

Control over the operating modes of low-temperature plasma generators, triggering mode inclusive, may be carried out by diverse methods. The most widely used method is adjusting the power of the supply source. Another method resides in control of the rate of working medium flow (FR, A, 2 045,865;DE, A1, 3,810,620).

The present invention makes use of a method for control over the plasma torch operating modes by changing the interelectrode gap. The method is a well-known one and can be carried into effect by a number of solutions. In one of such solutions the cathode is connected to the piston of a controlled hydraulic cylinder (EP, A1, 0289961). According to another known solution (EP, A1, 0249238), the electric motor controls, depending on the voltage applied thereto, the position of an axially-movable cathode with respect to a stationary anode.

DISCLOSURE OF THE INVENTION

The heretofore-known constructions of low-temperature plasma which make use of steam as a working medium, said steam resulting from evaporation of the liquid working medium during operation of the generator and passing through the passages in the electrodes, have a complicated construction and are inconvenient in use. Such a complication of the construction is due to the presence of external communications connecting the plasma generator to a liquid container, and of internal communications for connection to the electrodes. Elimination of said disadvantage is a principal object the present invention is to solve.

Another object of the invention is to simplify the arc initiation process and to control the torch operating modes.

The former object of the invention is accomplished due to constructionally integrating the torch with the container for the vaporizable liquid and providing its admission to the discharge chamber accompanied by evaporation of said liquid through a porous heat-conducting material with which the torch body-to-container joint is filled. The contained is filled with a moisture-absorbing material which is in contact with said porous heat-conducting material. To admit steam to the discharge chamber a ring made of a heat-conducting material is provided, said ring having passages opening into said chamber and being in contact with said porous material.

The torch body-to-container joint may be through a sleeve filled with the porous heat-conducting material.

The latter object is accomplished due to the provision and construction arrangement of a mechanism for special displacement of a cathode, adapted to impart intermittent motion to the cathode till its contacting the anode to initiate an arc, and a stepless control of the interelectrode gap there between. The former aim is attained by a spring-actuated button connected to a cathode-holder, while the latter, due to a lid coaxial with the cathode-holder and movable round the axis of the latter, said lid featuring a threaded joint with the container. The aforementioned button has a flange resting upon the inner wall of the lid.

The cathode-holder is movable along an electroinsulating tube put thereunto and enclosed in a tube from a heat-conducting material, both of said tubes running through the torch body and the container for the liquid to be vaporized.

BRIEF DESCRIPTION OF THE DRAWINGS

In what follows the present invention is illustrated in the best exemplary embodiment thereof shown in the accompanying drawings, wherein.

BEST METHOD OF CARRYING OUT THE INVENTION

Figure 1:
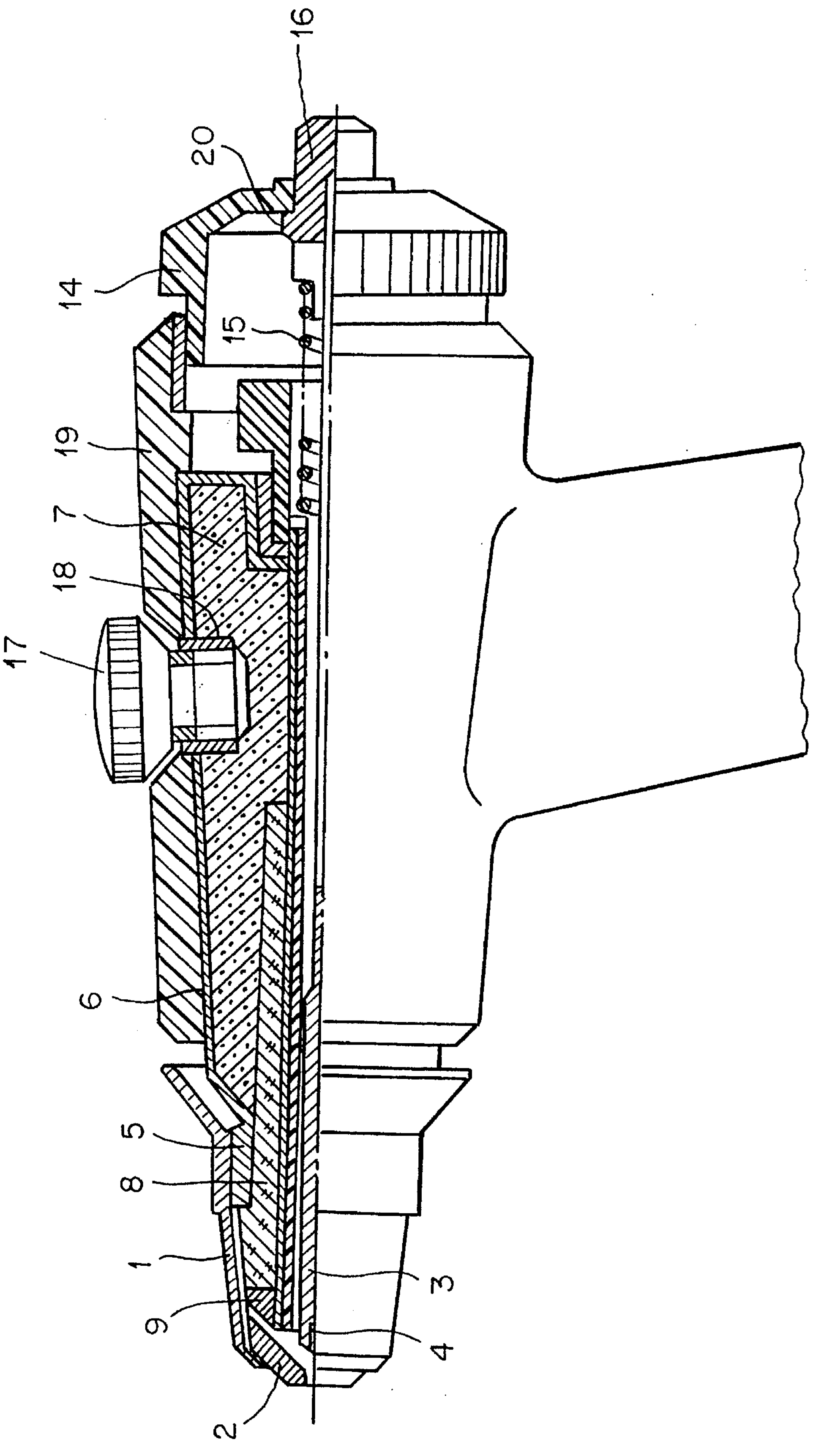
FIG. 1 is a side sectional view of the torch of the present invention.
Figure 2:
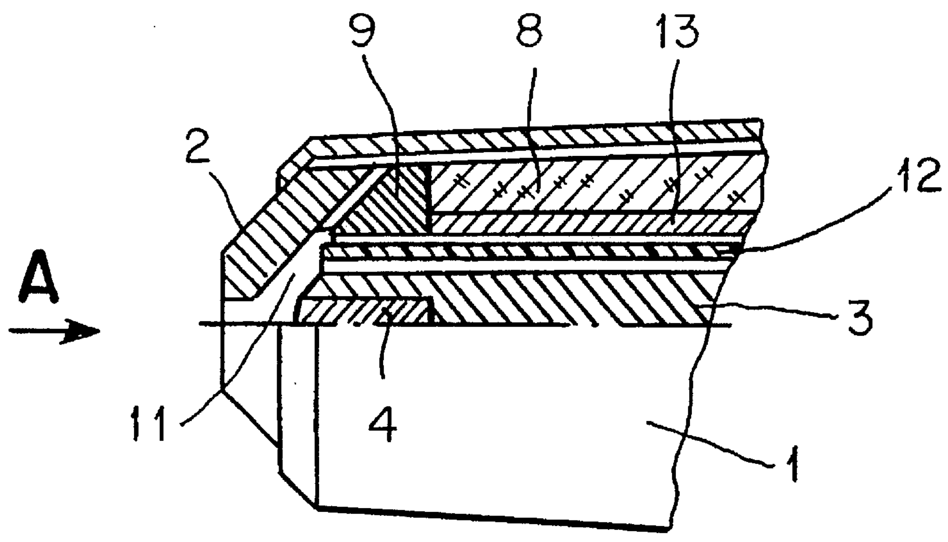
FIG.2 is a scaled-up view of an outlet portion of the torch body.
Figure 3:
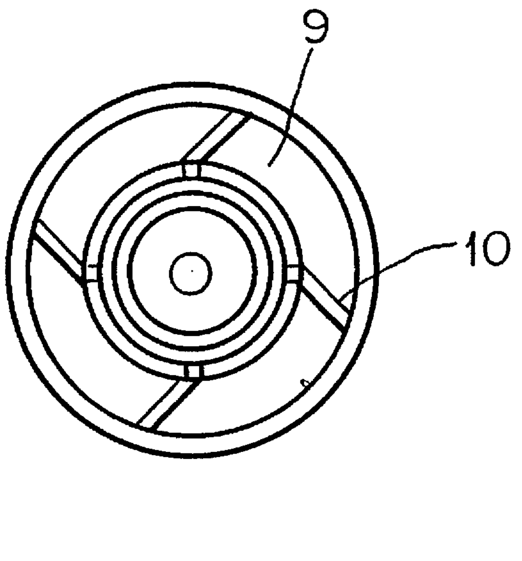
FIG.3 is a view along the arrow A in FIG.2, with the node out of position.

The torch has a body 1 accommodating coaxially-arranged an outlet nozzle, i.e., an anode 2 and a cathode-holder 3 with a rod-shaped centrally located cathode 4. The body 1 communicates with the container for a working fluid 6 through a sleeve 5. The container is filled with a moisture-absorbing material 7, and the sleeve 5, with a porous heat-conducting material 8 which is in contact with the moisture-absorbing material 7 and with a ring 9 made of a heat-conducting material and having tangential passages 10 opening into a discharge chamber 11 and situated on the surface contacting the nozzle-anode, the former on the side of the container, and the latter, on the side of the torch body.

The rod-shaped cathode holder is axially movable inside a moisture- and heat-resistant electroinsulating tube 12 running through the body 1 and the container 6, and encompassed by a heat-conducting tube 13 throughout its length.

The torch is provided with a mechanism for imparting an intermittent stepwise and stepless motion to the cathode-holder 3 and to the cathode itself, said mechanism appearing as a lid 14 arranged coaxially with the cathode-holder 3 and movable on thread with respect to the container 6, said lid having a center hole which accommodates a button 16 loaded by a spring 15 and connected to the cathode-bolder 3 so as to be electrically insulated therefrom. The button has a flange resting upon the inner wall of the lid 14.

The container 6 for the working fluid has a hole 18 closed with a blank plug 17 for filling-in the working fluid.

The supply voltage from a power source is fed with the aid of a conductor running behind a plastics facing 19 to the torch electrodes.

The torch operates as follows.

The blank plug 17 of the container 6 is opened and the working fluid (water) is filled through the hole 18 into the container 6, then the blank plug 17 is put in place, the power source is switch on to apply a voltage to the nozzle-anode 2 and the cathode 4 of the torch.

An arc is then stricken by a momentary pressing the button 16 of the cathode-holder displacement mechanism.

Upon pressing the button 16 the cathode-holder 3 performs intermittent motion inside the electroinsulating tube 13 till getting the cathode 4 in contact with the nozzle-anode 2. The cathode-holder 3 with the cathode 4 is returned to the initial position by the spring 15 which presses the flange of the button 16 against the inner wall of the lid 14.

Once the cathode 4 has been put out of contact with the nozzle-anode 2 an electric arc is initiated in the discharge chamber 11.

The energy released on the nozzle when electric current flows through the arc, boats the nozzle, and the heat thus generated to transmitted, via the heat-conducting ring, to the water contained in the porous boat-conducting material 8. As a result, water turns into steam and an excess pressure is developed under the action of which steam passes through the tangential passages 10 of the ring 9 and gets into the discharge chamber 11, then escapes through the center axial hole in the nozzle-anode 2, thus stabilizing the arc column and simultaneously cooling the electrodes.

The moisture-absorbing material 7 found in the container 6 provides for a uniform make-up of the porous material with water and a respectively uniform, as with time, water vaporization.

By turning the threaded lid 14 into or out of the end face of the container 6 opposite to the nozzle-anode 2 with the aid of the flange 20 of the button 16, one can displace gradually the cathode-holder 3 in the electroinsulating tube 12, thus controlling the interelectrode gap between the cathode and the nozzle-anode 2 in the discharge chamber.

An exemplary water-absorbing material 7 is kaolin wool or glass wool. An exemplary heat-conducting porous material 8 can be sintered copper shot or copper chips, or else copper loosened with a cutting tool. Duration of the process depends on the power drawn by the torch from a power source. A plasma torch having an input power of about 1 kW operates continuously for about 25 min., and the holding capacity of the reservoir is 70 ml. As regards the service life of the cells, a copper anode (nozzle) and a copper cathode-holder with a diameter of 1.2 mm, 5 mm long hafnium insert provide for a 20–30 hour operation of the electrodes depending on the working amperage (6 or 3A, respectively). A stream of hot medium need not be controlled since the construction of the torch predetermines generation of a required amount of steam, that is, the higher the temperature of the electrodes the greater amount of steam is produced by the steam-generation system.

The output current of the power source is changed depending on a required mode of use of the present torch, and the lid 14 is rotated in order to provide conditions for forming a stable arc column within a broad range of current intensities.

INDUSTRIAL APPLICABILITY

When the present torch made to the invention disclosed herein has been tasted, there have been attained stable arc initiation and arcing process in a current intensity range of from 1 to 5 A with an output voltage of the power source from 130 to 170 V.

What is claimed is:

1. An electric-arc plasma torch, comprising a body (1) with a discharge chamber (11), both being arranged coaxially with an outlet nozzle-anode (2) and a rod-shaped centrally located cathode (4) fixed in a holder (3), characterized in that it is provided with a container (6) for a working fluid, said container being connected to the body (1) and being filled with a moisture-absorbing material (7), and a gap between the body (1) and the container (6) said gap filled with a porous heat-conducting material (8) which contacts, on a side of the container (6), the moisture-absorbing material (7) in the container (6), and on the side of the body (1), a ring (9) made of a heat-conducting material and provided with passages (10) opening into a discharge chamber (11), said ring being in contact with the nozzle-anode (2).

2. An electric-arc plasma torch according to claim 1, characterized in that the container (6) is connected to the body (1) through a sleeve (5) filled with a porous material inside which the heat-conducting cathode-holder (3) runs.

3. An electric-arc plasma torch according to claim 1, characterized in that the cathode-holder (3) is enclosed in an electrically insulated tube (12) which in turn is placed in a tube (13) made of a heat-conducting material, both of the tubes (12) and (13) passing through the body (1) and the container (6).

4. An electric-arc plasma torch according to claim 3, characterized in that the cathode-holder (3) is axially movable in the electrically insulated tube (12) and is provided with a mechanism for imparting an intermittent motion thereto until the cathode makes contact with the anode to strike an arc and for control of a working gap between the anode and the cathode.

5. An electric-arc plasma torch according to claim 4, characterized in that the mechanism for imparting motion to the cathode-holder (3) comprises a lid (14) arranged coaxially thereto and movable in a thread with respect to the torch, said lid having a center hole, wherein a button (16) is accommodated, said button being spring-loaded, connected to the cathode-holder, and electrically insulated therefrom, and also having a flange resting upon an inner wall of said lid.

* * * * *